(12) United States Patent
Ikeda et al.

(10) Patent No.: US 6,991,729 B2
(45) Date of Patent: Jan. 31, 2006

(54) OPTICAL ISOMER SEPARATING FILLER, PRODUCTION METHOD THEREFOR AND APPLICATION METHOD THEREFOR

(75) Inventors: Hirokazu Ikeda, Arai (JP); Atsushi Onishi, Tsukuba (JP); Koichi Murazumi, Himeji (JP)

(73) Assignee: Daicel Chemical Industries, Ltd., Osaka (JP)

(*) Notice: Subject to any disclaimer, the term of this patent is extended or adjusted under 35 U.S.C. 154(b) by 58 days.

(21) Appl. No.: 10/474,438

(22) PCT Filed: Apr. 12, 2002

(86) PCT No.: PCT/JP02/03688

§ 371 (c)(1),
(2), (4) Date: Jan. 9, 2004

(87) PCT Pub. No.: WO02/083298

PCT Pub. Date: Oct. 24, 2002

(65) Prior Publication Data

US 2004/0112830 A1    Jun. 17, 2004

(30) Foreign Application Priority Data

Apr. 12, 2001  (JP) .............................. 2001-114482

(51) Int. Cl.
*B01D 15/08*    (2006.01)
(52) U.S. Cl. .................. 210/656; 210/635; 210/198.2; 210/502.1; 366/287; 366/297
(58) Field of Classification Search ................ 210/635, 210/656, 659, 198.2, 502.1; 366/287, 288, 366/297, 298, 299, 300, 301
See application file for complete search history.

(56) References Cited

U.S. PATENT DOCUMENTS

| 3,799,917 A | | 3/1974 | Rathke |
|---|---|---|---|
| 5,155,144 A | | 10/1992 | Manganaro et al. |
| 5,770,088 A | * | 6/1998 | Ikeda et al. ................. 210/659 |

FOREIGN PATENT DOCUMENTS

| FR | 1102384 A | 10/1955 |
|---|---|---|
| JP | 6-308108 A | 11/1994 |
| JP | 9-302088 A | 11/1997 |
| JP | 10185894 A | 7/1998 |
| JP | 2000-256220 A | 9/2000 |
| JP | 2000256220 A | 9/2000 |

* cited by examiner

*Primary Examiner*—Ernest G. Therkorn
(74) *Attorney, Agent, or Firm*—Birch, Stewart, Kolasch & Birch, LLP

(57) ABSTRACT

The objectives of this invention are to provide a filler for separating optical isomers, capable of efficiently carrying out optical resolution of optical isomer mixtures, a process for producing the filler, and a method for using the filler.

The present invention provides a process for producing a filler for separating optical isomers which process comprises stirring a carrier and a solution including an optically active polymer compound with a double spindle vertical mixer. The present invention further provides a filler produced by the process and a method for using the filler in liquid chromatographic separation methods and simulated moving bed chromatographic separation methods.

11 Claims, 4 Drawing Sheets

OPTICAL ISOMER SEPARATING FILLER, PRODUCTION METHOD THEREFOR AND APPLICATION METHOD THEREFOR

This application is the national phase under 35 U.S.C. § 371 of PCT International Application No. PCT/JP02/03688 which has an International filing date of Apr. 12, 2002, which designated the United States of America.

TECHNICAL FIELD

This invention relates to a filler used for separating optical isomers, a process for preparing the filler, and a method for using it. More specifically, this invention relates to a process for preparing a filler suitable for separating a mixture of optical isomers, whereby optically active polymer compounds can uniformly and effectively be supported on a carrier. This invention also involves a filler, used for separating optical isomers, of which separation ability is improved, and a method for using the filler.

BACKGROUND ART

Conventionally, separation technologies including liquid chromatography, supercritical chromatography and gas chromatography as a method of isolating a desired component from an isomer mixture containing two or more components have widely been used for various kinds of analyses such as environmental analysis, metabolic analysis and impurity analysis. These separation technologies are considered to be a kind of analysis technology, and have an aspect different from a technology for isolating a particular component with a high purity from a mixture that includes plural components. In other words, the concept of "separation" in the field of analysis technology means separating each component from a mixture that includes plural components with such a purity as to be required to identify each component. Consequently contamination of a component with other components unavoidably accompanies "separation" in this sense. On the other hand, in the fields of separation of physiologically active substances and separation of optically active antipodes, "separation" means the separation of a single substance at a high purity. Therefore the separation of, for example, optically active compounds at a high purity cannot be achieved by separation technologies used for ordinary chemical analyses. Recently, researchers began to employ simulated moving bed chromatographic separation methods to achieve separation on an industrial scale at a high purity.

Under these circumstances demand for fillers to be used for separating optical isomers has been increasing, and technologies to produce fillers having stable qualities on a large scale have been desired.

One of the known methods of producing a filler for separating optical isomers is a method in which silica gel is immersed in a solution of polysaccharide derivatives and the solvent is distilled off from the solution, proposed by Okamoto et al. (Y. Okamoto, M. Kawashima and K. Hatada, J. Am. Chem. 106, 5357, 1984). The others are an impact method in high speed flow described in JP 3-2009, B and a method of preparing a carrier by spraying disclosed in JP 63-84626, A.

These methods can successfully produce a filler for separating optical isomers in an amount of some hundred grams, an amount typically used on a laboratory scale. The produced filler has a separation ability that is satisfactory to some extent.

However, when a researcher tried to produce a filler for separating optical isomers on a greater scale, in an amount of 1 kg to several ten kg, it turned out that a filler with an excellent separation ability could not always be obtained by this method. For example, to make the carrier uniformly support active components such as polysaccharide derivatives and to sprinkle the inner walls of pores of the carrier with the polysaccharide derivatives are difficult. Besides, after the completion of the supporting process, the solvent remaining in the carrier is uneven. Further, granules are formed through agglomeration of unsupported polysaccharide derivatives. These factors lower the separation ability to such an extent that the obtained filler cannot practically be used.

Also, when the columns are filled with a filler for separating optical isomers and optical isomers are separated, it is preferable that the columns should have a smaller pressure loss to let liquid, gas or supercritical fluid pass through. In view of this requirement, generally, methods that might break the carrier cannot be employed. Therefore, although the above mentioned methods may provide excellent fillers in a laboratory scale production, the methods cannot always provide good fillers in a larger scale, e.g. a commercial scale production due to a larger mixing power applied to the carrier and the polysaccharide derivatives, or change in other conditions.

An objective of the present invention is to provide a process of producing, on a commercial scale, a filler for separating optical isomers that has an excellent separation ability, a filler for separating optical isomers having an excellent separation ability that is produced on a commercial scale, and a method of using the filler.

Another objective of the present invention is to provide a process of producing a filler for separating optical isomers, which filler comprises a carrier and an optically active polymer compound supported on the carrier, the filler thus produced, and a method of using the filler.

SUMMARY OF THE INVENTION

In order to solve the aforementioned problems, the present invention provides:

(1) a process of producing a filler for separating optical isomers which comprises placing a carrier and an optically active polymer compound solution in a tank, and mixing the carrier and the solution with a double spindle vertical mixer to make the carrier support the optically active polymer compound;

(2) the process as described in process (1), wherein the double spindle vertical mixer has two stirring blades, each of which moves around in the tank while rotating;

(3) the process as described in process (1) or (2), wherein the moving direction and the rotating direction of each stirring blade are the same direction or opposite directions;

(4) the process as described in process (3), wherein each blade moves along the locus of a hypocycloid or a hypercycloid;

(5) the process as described in any one of processes (1)–(4), wherein each of the blades is a curved stirring stick or a curved stirring ring;

(6) the process as described in any one of processes (1)–(5), wherein the optically active polymer compound solution includes a polymer compound, the polymer compound being a polysaccharide derivative;

(7) the process as described in process (6), wherein the polysaccharide derivative is at least one selected from the group consisting of a cellulose ester derivative, a cellulose carbamate derivative, an amylose ester derivative and an amylose carbamate derivative;

(8) the process as described in any one of processes (1)–(7), wherein the carrier is a porous inorganic carrier;

(9) the process as described in any one of processes (1)–(8), wherein the carrier has an average particle size of 1–300 μm, and an average pore size of 200–8,000 Å;

(10) the process as described in any one of processes (1)–(8), wherein the carrier has an average particle size of 15–100 μm, and an average pore size of 200–4,000 Å; and

(11) the process as described in process (1), wherein the carrier is silica gel.

(12) In order to solve the aforementioned problems, this invention also provides a filler for separating optical isomers, the filler being produced by any one of processes (1)–(10).

(13) In another preferred embodiment of the invention as means for solving the aforementioned problems, the filler for separating optical isomers as described in process (11) is used for optical resolution by a chromatographic separation method.

DETAILED DESCRIPTION OF THE INVENTION

The double spindle vertical mixer in accordance with the present invention comprises at least a tank that contains a carrier and an optically active polymer compound solution, and two stirring blades that stir the contents in the tank, wherein the stirring blades are arranged so that they can stir the contents.

The volume of the tank is typically 0.03–3 m³.

Preferably, each of the two stirring blades moves around in the tank while spinning on its axis. The combination of the moving-around and the spinning by each blade enables the carrier to uniformly support the optically active polymer compound. This special stirring makes it possible that even pores of the carrier a reused for supporting the compound. Also, the stirring successfully prevents the compound from agglomerating to granules.

The two blades may spin in the same direction or different directions.

Figure 1:
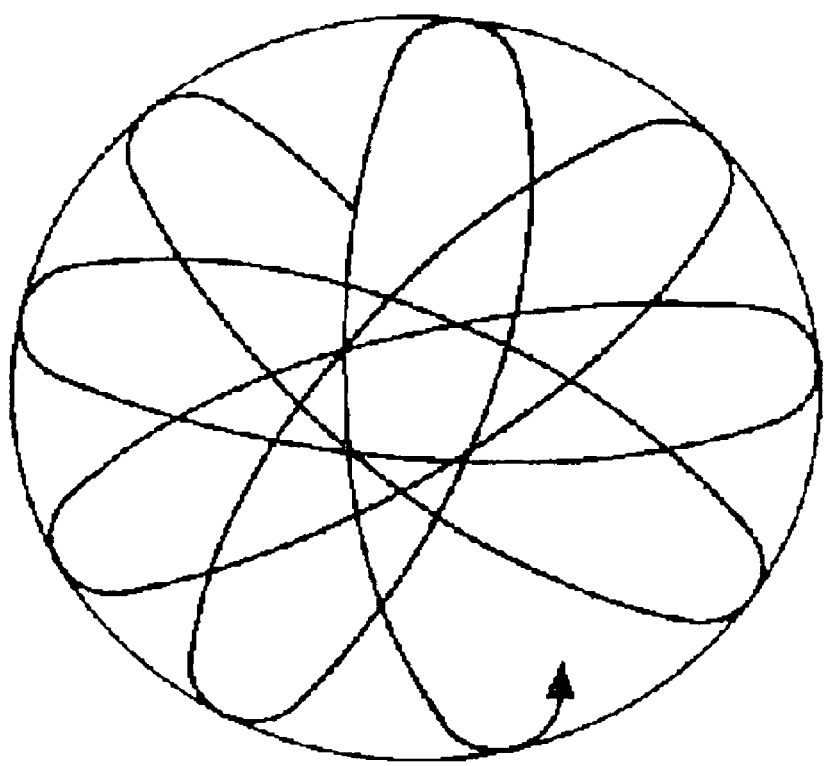
FIG. 1 is an illustration that shows a hypocycloid.
Figure 2:
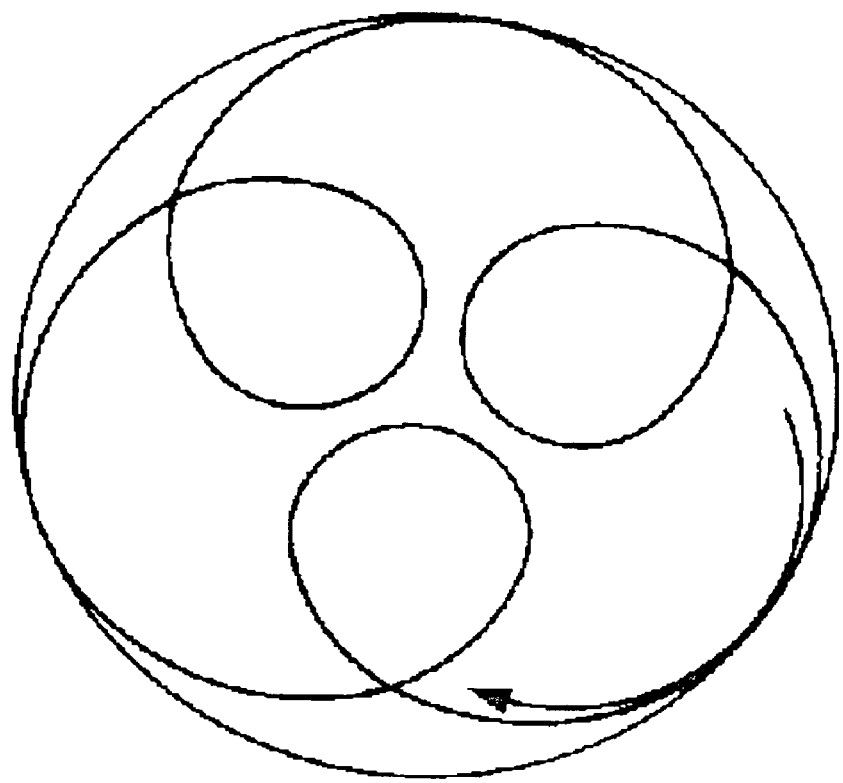
FIG. 2 is an illustration that shows a hypercycloid.

Preferably, the two blades move around along the locus of such a hypocycloid as shown in FIG. 1 or that of such a hypercycloid as shown in FIG. 2.

Each blade may have the shape of a curved stick or a curved ring.

Especially preferable examples of the shape of the curved stick are a hook and an anchor-shaped hook.

The employment of these types of blade leads to a thorough uniform stirring, which results in a complete mixing of the carrier in a particle form and the optically active polymer compound solution. The blades of the special shape can exert such a stirring force as pressing force or kneading force on the contents. Consequently, filler particles staying near the heating member of the tank are smoothly replaced with those staying at other parts in the tank, which effectively expedites the removal of the solvent to the outside of the system. This effect, in turn, facilitates drying the filler and reduces agglomeration of the particles.

The filler for separating optical isomers comprises the carrier and an optically active polymer compound supported thereon. An example of the optically active polymer compound is a polysaccharide derivative, which is a modified polysaccharide product.

The polysaccharide derivative may be any of naturally occurring polysaccharide, modified natural polysaccharide and synthesized polysaccharide, as long as it is optically active.

Specific examples of the polysaccharides are: α-1,4-glucan (amylose, amylopectin), β-1,4-glucan (cellulose), α-1,6-glucan (dextran), β-1,6-glucan(pustulan), α1,3-glucan, β-1,3-glucan (curdlan, schizophylan, etc.), β-1,2-glucan (Crawn Gall polysaccharide), β-1,4-galactan, α-1,6-mannan, β-1,4-mannan, β-1,2-fructan (inuline), β-2,6-fructan (levan), β-1,4-xylan, β-1,3-xylan, β-1,4-N-acetylchitosan (chitin), pullulan, agalose, arginic acid, cyclodextrins, etc. Also may be used a starch including amylose.

Among them preferred are cellulose, amylose, β-1,4-xylan, β-1,4-chitosan, chitin, β-1,4-mannan, inuline, curdlan, etc. because highly pure products are available easily. Cellulose, amylose, etc. are particularly preferable.

The number average polymerization degree, which is indicated by an average number of pyranose or furanose rings per molecule, of these polysaccharides is typically at least 5, preferably not less than 10. This degree does not have specific upper limits. In view of ease in handling, however, it should be not more than 1000, preferably not more than 500. Furthermore, the number average polymerization degree ranges preferably between 5 and 1000, more preferably between 10 and 1000, particularly preferably between 10 and 500.

Preferable polysaccharide derivatives include poly-saccharide compounds derived by replacing part or all of the hydrogen atoms on the hydroxyl groups of the above-mentioned polysaccharides with compounds having groups that are capable of reacting with hydroxyl groups so that the compounds are bonded to the polysaccharides through ester linkage, urethane linkage, ether linkage, etc. The compounds having groups that are capable of reacting with hydroxyl groups include isocyanic acid derivatives, carboxylic acids, esters, acid halides, acid amides, halogenated compounds, epoxy compounds, aldehydes, alcohols, and other compounds having leaving groups. Examples of the other compounds having leaving groups are aliphatic acid compounds, alicyclic compounds, aromatic compounds, hetero-aromatic compounds, etc.

Of them particularly preferable polysaccharide derivatives include polysaccharide ester derivatives and polysaccharide carbamate derivatives. These polysaccharide ester derivatives or polysaccharide carbamate derivatives are polysaccharide compounds in which part of or all of the hydrogen atoms on the hydroxy groups or amino groups of the polysaccharide are substituted with at least one of the atomic groups represented by chemical formulae (1), (2), (3) and (4):

-continued

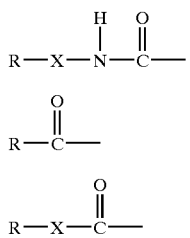

wherein R stands for an aromatic group which may contain a hetero atom and may be unsubstituted or substituted with at least one selected from the group consisting of an alkyl group having 1–12 carbon atoms, an alkoxy group having 1–12 carbon atoms, an alkylthio group having 1–12 carbon atoms, cyano group, a halogen atom, an acyl group having 1–8 carbon atoms, an alkoxycarbonyl group having 1–8 carbon atoms, nitro group, amino group and an alkylamino group having 1–8 carbon atoms. The aromatic group includes phenyl, naphthyl, phenanthryl, anthracyl, indenyl, furyl, thionyl, pyryl, benzofuryl, benzothionyl, indyl, pyridyl, pyrimidyl, quinolyl, isoquinolyl, etc. Of these, phenyl, naphthyl, pyridyl, etc. are preferred. Particularly preferred Rs are a halogenated phenyl and an alkyl phenyl.

X stands for a hydrocarbon group having 1–4 carbon atoms, which may contain a double bond or triple bond. Examples of X are methylene, methyl methylene, ethylene, ethylidene, ethenylene, ethynylene, 1,2- or 1,3-propylene, 1,1- or 2,2-propylidine group, etc.

The carbamate derivatives of the polysaccharide desirably usable in the present invention are obtained by reacting an isocyanate represented by formula (5) or (6) with the polysaccharide, and the ester derivatives of the polysaccharide desirably usable in the present invention are obtained by reacting an acid chloride represented by formula (7) or (8) with the polysaccharide:

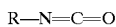 (5)

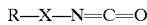 (6)

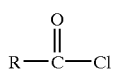 (7)

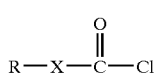 (8)

wherein R and X are as defined above.

The degree of substitution with the atomic groups described hereinbefore in the polysaccharide is usually 10%–100%, preferably 30%–100% and more preferably 80%–100%. The degree of less than 10% is not preferable because the resulting polysaccharide derivative has little ability of optical resolution. Also, the degree of less than 30% is not very preferable because optical resolution is sometimes insufficient depending upon the species and concentration of the optical isomer mixture to be separated. On the other hand, the degree in excess of 80% is preferable because particles for the filler having excellent optical resolution ability can be obtained. The degree can be determined by elemental analysis of carbon, hydrogen and nitrogen before and after the substitution.

To the tank provided with the double spindle vertical mixer is fed the optically active polymer compound in the form of a solution or dispersion. The solvent for the solution or dispersion includes a ketone such as acetone or methyl-ethyl-ketone, an alkylester of an aromatic carboxylic acid including an alkylester of benzoic acid such as methyl benzoate, methyl acetamide, methylene chloride, and a halogen compound such as chloroform.

The mixing ratio of the optically active polymer compound to the solvent is 1000 parts by weight to 300–10,000 parts by weight, preferably to 300–1,000 parts by weight. When the mixing ratio is within the range, the stirring with the double spindle vertical mixer enables the surface of the carrier to uniformly support the optically active polymer compound.

For the carrier can be used organic and inorganic porous substances. The inorganic porous substances are preferable. An example of the suitable organic carriers is a high molecular weight compound selected from the group consisting of polystyrene, polyacrylamide, polyacrylate, etc. Examples of the suitable inorganic carriers are silica gel, alumina, magnesia, glass, kaolin, titanium oxide, silicate salts, hydroxy apatite, etc. An especially preferable carrier is silica gel. The average particle size of the carrier, for example, that of silica gel is usually 1–300 $\mu$m, preferably 15–100 $\mu$m. When the average particle size is less than 1 $\mu$m, the column pressure of the apparatus is raised to an unpractical extent. On the other hand, when the average particle size is more than 300 $\mu$m, the number of plates is so small that a sufficient separation may not be obtained. The average pore size of silica gel is 200–8,000 Å, preferably 200–4,000 Å. The carrier having the average pore size within this range can support a polysaccharide derivative having a number average polymerization degree of 5–5,000 at a high supporting rate, for example, 40% by weight. The surface of the carrier should be treated to remove the remaining silanol that might have undesirable effects on the surface and to improve an affinity for the optically active high molecular weight compound. However, even if the surface is not treated at all, it will not cause problems.

Examples of preferable surface treating methods are silane finish with an organic silane compound and treatment by a plasma polymerization. Of the methods of silane finish, one with aminopropyl silane is preferable.

When a carrier has the above-mentioned average pore size, the mixing and stirring of the carrier and the optically active polymer compound solution in the tank of the double spindle vertical mixer makes the solution permeate into the pores of the carrier, which results in a filler for separating optical isomers having pores of which inner walls are uniformly coated with the compound. Because this filler has the carrier of which pores are not filled up with the optically active polymer compound, the pressure loss due to the filler becomes small.

In the method of the present invention, mixing with the double spindle vertical mixer the carrier and the optically active polymer compound solution or dispersion placed in the tank of the mixer makes the carrier support the optically active polymer compound. Supporting may be carried out, depending on the kinds of the carrier and the optically active polymer compound, through a simple addition of the compound to the carrier or a chemical bonding, made by a reaction in the tank, between the compound and the carrier.

Also, the contents in the tank may be irradiated with light, radiant rays such as γ ray or electromagnetic waves such as micro wave to more firmly fix the optically active polymer compound on the carrier, while the carrier and the optically active polymer compound are being stirred in the tank of the double spindle vertical mixer.

The amount ratio of the optically active polymer compound solution to the carrier, when both are placed in the tank of the double spindle vertical mixer, should be 100–500 parts by weight to 100 parts by weight.

The stirring should be carried out typically at a room temperature to 80° C., preferably at a room temperature to 60° C.

In the method of the present invention, the stirring with the double spindle vertical mixer is followed by ordinary classification such as a vibration screen, a cyclone, an air classification or a wet classification, washing and drying. Then, the filler for separating optical isomers is produced.

The method of the present invention can provide, by the stirring with the double spindle vertical mixer, preferably under the above-mentioned conditions, a filler for separating optical isomers, which filler comprises the carrier and at least 10 weight %, preferably 15–50 weight %, particularly 15–45 weight % of the optically active polymer compound, especially the polysaccharide derivative supported on the carrier. The separating ability of the filler is excellent. It should be noted that the amount of the supported polymer compound separator, which is up to 50 weight %, is amazingly large.

The amount of the supported means the weight of the optically active polymer compound, for example, the polysaccharide derivative based on the total weight of the filler. The amount has no specific upper limits. When the amount exceeds 60 weight %, however, the number of plates is decreased, which, in turn, undesirably lowers the separation efficiency.

When the amount of the optically active polymer compound, especially the polysaccharide derivative, supported on the carrier is within the range, the filler is capable of separating optical isomers at a high efficiency.

The filler produced by the method in accordance with the present invention may suitably be used for gas chromatographic separation, supercritical chromatographic separation, liquid chromatographic separation and simulated moving bed chromatographic separation. Of them, liquid chromatographic separation and simulated moving bed separation, especially simulated moving bed separation can suitably employ this filler, which yields high separation efficiency.

In the followings, we will explain the present invention, referring to examples. It should be noted that the invention is not limited by the following examples.

EXAMPLES

Working Example 1

<Preparation of a Filler for Separating Optical Isomers Comprising Silica Gel and Cellulose tri-p-methyl Benzoate Supported Thereon with a Double Spindle Vertical Mixer>

1,000 g of cellulose tri-p-methyl benzoate was dissolved in a mixed solvent of 5.3 kg of methylene chloride and 1.1 kg of methyl benzoate. 7.4 kg of the obtained solution and 4 kg of silica gel, of which average particle size and average pore size were 20 $\mu$m and 1,000 Å respectively, were placed in the tank of a double spindle vertical mixer produced by DALTON Corporation (model: 25AMV-rr, shape of the stirring blades: curved stick, spinning directions of the two blades: same, locus along which the blades move around: hypocycloid). The volume of the tank was 60 liters. The contents in the tank were stirred at 45 rpm in spinning and at 23 rpm in hypocycloidal moving at the room temperature for one hour. Then the tank was heated with warm water passing through the heating member and the pressure inside the tank was reduced with a vacuum pump. Thus the solvent was removed from the tank.

After the completion of the stirring, the obtained filler for separating optical isomers was taken out.

A column of 25 cm in length and 1 cm in inner diameter was filled with the obtained filler. The column was fitted into a liquid chromatographic separation apparatus and an optical resolution of indapamide was carried out with the apparatus.
Mobile phase: n-hexane/2-propanol/diethylamine 70/30/0.1 (v/v) mixture
Column temperature: 40° C.
Flow rate: 4.7 ml/min.
UV detector: 214 nm The separation factor $\alpha$ in this process under the above-mentioned conditions is shown in Table 1.

The separation factor $\alpha$ is defined in the followings. The separation factor $\alpha$ can be calculated by the formula: $\alpha = k_2'/k_1'$. $k_1'$ and $k_2'$ are calculated by the formulae $k_1' = (t_1 - t_0)/t_0$ and $k_2' = (t_2 - t_0)/t_0$, respectively, wherein $t_1$ and $t_2$ each mean the elution times of the respective optical isomers, and $t_0$ means the elution time of tri-tert-butylbenzene. The separation factor $\alpha$ means how far two peaks, represented by $k_1'$ and $k_2'$, are from each other. The larger the value of $\alpha$ is, the more excellent the separation ability is.

Also, the number of plates N in this liquid chromatographic separation apparatus is shown in Table 1.

Comparative Example 1

<A Preparation of a Filler for Separating Optical Isomers Comprising Silica Gel and Cellulose tri-p-methyl Benzoate Supported Thereon with a Single Spindle Mixer on a Laboratory Scale>

A solution obtained by dissolving 10 g of cellulose tri-p-methyl benzoate in a mixed solvent of 50 ml of methylene chloride and 10 ml of methyl benzoate, and 40 g of silica gel which is similar to that used in Working Example 1 were placed in a 100 ml round flask. Into the flask was inserted a propeller stirrer, and stirring was carried out for 2 hours. The pressure inside the flask was reduced and the solvent was removed from it. Thus a filler for separating optical isomers was obtained.

The separation factor a and the number of plates N of the filler were calculated in the same ways as in Working Example 1, and the results are shown in Table 1.

TABLE 1

| | $\alpha$ | N |
|---|---|---|
| Working Example 1 | 1.34 | 1630 |
| Comparative Example 1 | 1.25 | 380 |

Working Example 2

<Preparation of a Filler for Separating Optical Isomers Comprising Silica Gel and Cellulose (3,5-dimethylphenyl) Carbamate Supported Thereon with a Double Spindle Vertical Mixer>

The steps of Working Example 1 were repeated, except that a solution made by dissolving 2,000 g of cellulose (3,5-dimethylphenyl)carbamate in 10.3 kg (13 liters) of acetone and 8,000 g of silica gel were used instead of the solution obtained by dissolving 1,000 g of cellulose tri-p-methyl benzoate in a mixed solvent of 5.3 kg of methylene chloride and 1.1 kg of methyl benzoate and 4,000 g of silica gel.

The separation factor α and the number of plates N of the filler are shown in Table 2.

Comparative Example 2

<A Preparation of a Filler for Separating Optical Isomers Comprising Silica Gel and Cellulose (3,5-dimethylphenyl) Carbamate Supported Thereon with a Single Spindle Mixer>

A solution obtained by dissolving 20 g of cellulose (3,5-dimethylphenyl)carbamate in 103 g (130 ml) of acetone, and 80 g of silica gel were placed in a 500 ml round flask. Into the flask was inserted a propeller stirrer, and stirring was carried out for 2 hours. The pressure inside the flask was reduced and the solvent was removed from it. Thus a filler for separating optical isomers was obtained.

The separation factor α and the number of plates N of the filler were calculated in the same ways as in Working Example 1, and the results are shown in Table 2.

TABLE 2

|  | α | N |
| --- | --- | --- |
| Working Example 2 | 2.00 | 1890 |
| Comparative Example 2 | 1.79 | 1050 |

Working Example 3

<Preparation of a Filler for Separating Optical Isomers Comprising Silica Gel and Amylose tris(3,5-dimethylphenyl)Carbamate Supported Thereon with a Double Spindle Vertical Mixer>

The steps of Working Example 1 were repeated, except that a solution made by dissolving 2,000 g of amylose tris(3,5-dimethylphenyl)carbamate in 20.7 kg (14 liters) of a mixed solvent of chloroform and N,N-dimethylacetamide (the volume ratio of chloroform to N,N-dimethylacetamide: 99/1) and 8,000 g of silica gel were used instead of the solution obtained by dissolving 1,000 g of cellulose tri-p-methyl benzoate in a mixed solvent of 5.3 kg of methylene chloride and 1.1 kg of methyl benzoate and 4,000 g of silica gel.

The separation factor α and the number of plates N of the filler are shown in Table 3.

Comparative Example 3

<A Preparation of a Filler for Separating Optical Isomers Comprising Silica Gel and Amylose tris(3,5-dimethylphenyl)Carbamate Supported Thereon with a Single Spindle Mixer>

A solution obtained by dissolving 20 g of amulose tris(3,5-dimethylphenyl)carbamate in a mixed solvent of 137 ml of chloroform and 207 g (140 ml) of N,N-dimethylacetamide, and 80 g of silica gel were placed in a 500 ml round flask. Into the flask was inserted a propeller stirrer, and stirring was carried out. The pressure inside the flask was reduced and the solvent was removed from it. Thus a filler for separating optical isomers was obtained.

The separation factor α and the number of plates N of the filler were calculated in the same ways as in Working Example 1, and the results are shown in Table 3.

TABLE 3

|  | α | N |
| --- | --- | --- |
| Working Example 3 | 3.49 | 1700 |
| Comparative Example 3 | 3.15 | 1480 |

Working Example 4

<Preparation of a Filler for Separating Optical Isomers Comprising Silica Gel and Amylose tris(3,5-dimethylphenyl)Carbamate Supported Thereon with a Double Spindle Vertical Mixer>

The steps of Working Example 1 were repeated, except that a solution made by dissolving 2,800 g of amylose tris(3,5-dimethylphenyl)carbamate in 21liters of ethyl acetate and 4,200 g of silica gel of which average particle size and average pore size were 20 µm and 1,300 Å respectively were used instead of the solution obtained by dissolving 1,000 g of cellulose tri-p-methyl benzoate in a mixed solvent of 5.3 kg of methylene chloride and 1.1 kg of methyl benzoate and 4,000 g of silica gel.

Figure 3:
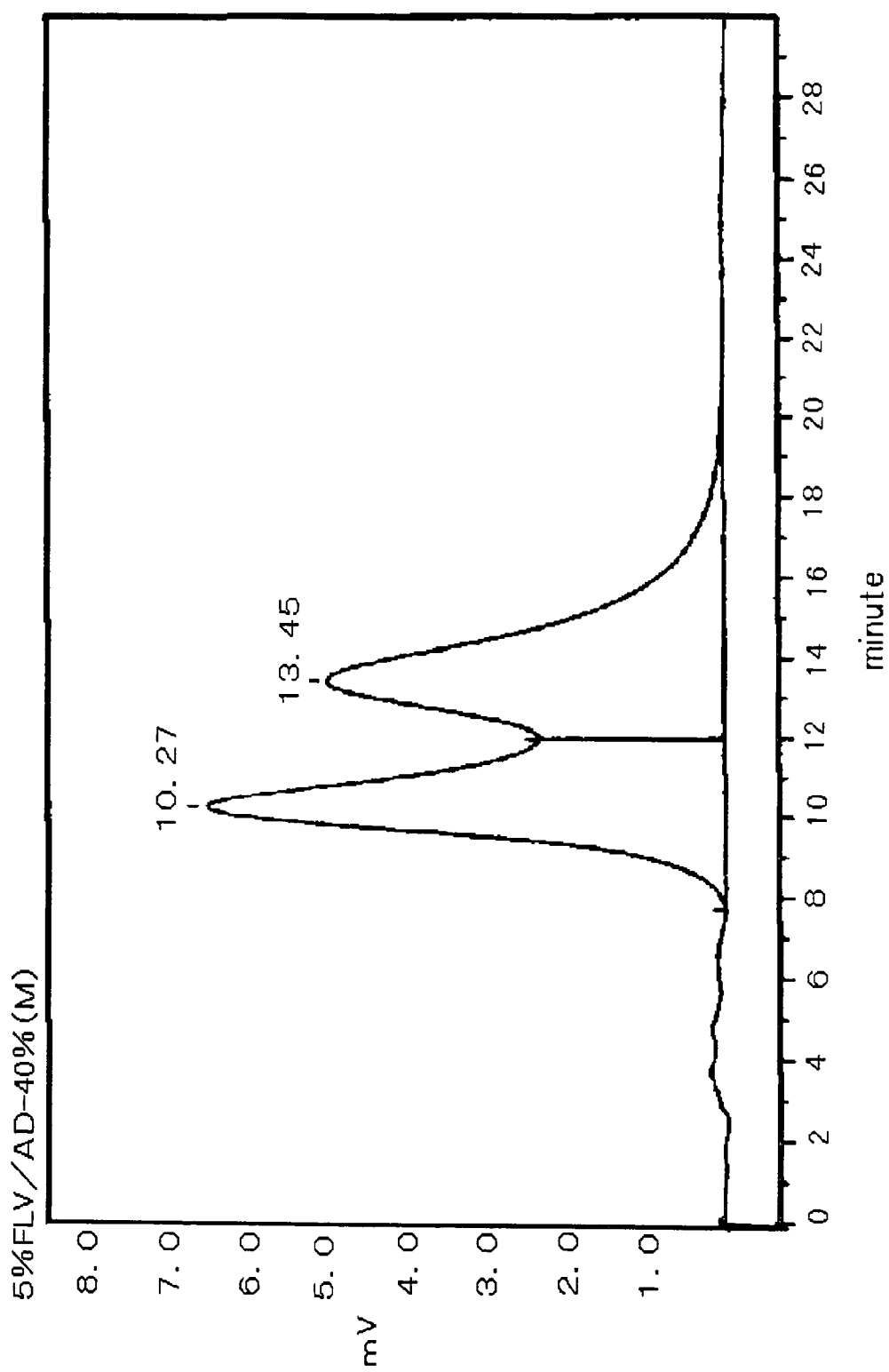
FIG. 3 is a chromatogram obtained with the liquid chromatographic apparatus in Working Example 4.

A chromatogram obtained with the liquid chromatographic separation apparatus is shown in FIG. 3 and the separation productivity with a single column apparatus is shown in Table 4. The mobile phase in the liquid chromatographic separation apparatus was ethanol, the flow rate of the mobile phase was 1.0 ml/minute, the temperature was 25° C., and the wavelength of the detector was 254 nm. Also, the mobile phase in the single column apparatus was ethanol, the flow rate of the mobile phase was 1.0 ml/minute, and the temperature was 25° C.

Comparative Example 4

<A Preparation of a Filler for Separating Optical Isomers Comprising Silica Gel and Amylose tris(3,5-dimethylphenyl)Carbamate Supported Thereon with a Single Spindle Mixer>

A solution obtained by dissolving 20 g of amulose tris (3,5-dimethylphenyl)carbamate in 150 ml of ethyl acetate, and 30 g of silica gel were placed in a 500 ml round flask. Into the flask was inserted a propeller stirrer, and stirring was carried out. The pressure inside the flask was reduced and the solvent was removed from it. Thus a filler for separating optical isomers was obtained.

Figure 4:
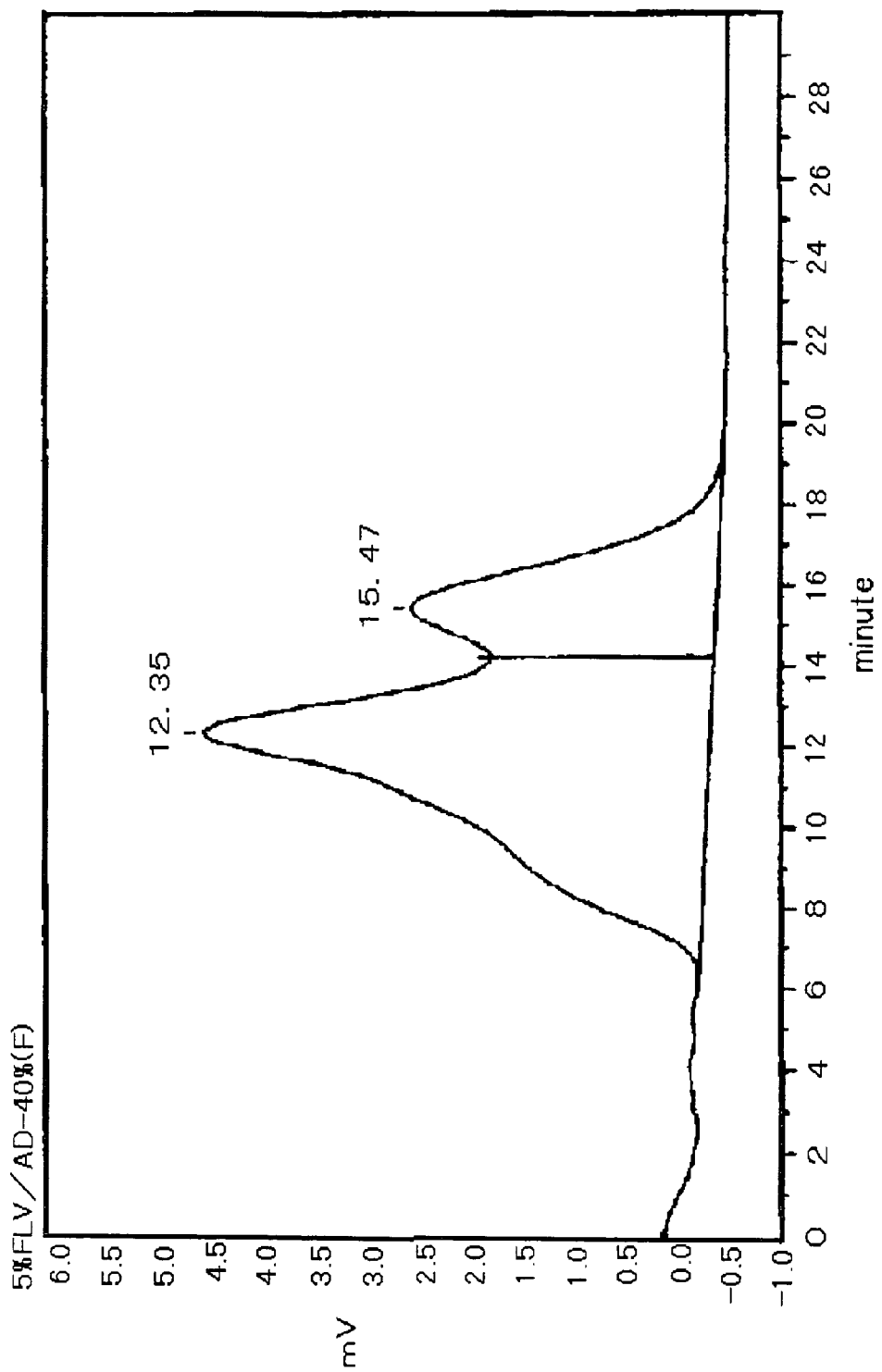
FIG. 4 is a chromatogram obtained with the liquid chromatographic apparatus in Comparative Example 4.

A chromatogram obtained with the liquid chromatographic separation apparatus is shown in FIG. 4 and the separation productivity with a single column apparatus is shown in Table 4. The mobile phase in the liquid chromatographic separation apparatus was ethanol, the flow rate of the mobile phase was 1.0 ml/minute, the temperature was 25° C., and the wavelength of the detector was 254 nm. Also, the mobile phase in the single column apparatus was ethanol, the flow rate of the mobile phase was 1.0 ml/minute, and the temperature was 25° C.

TABLE 4

|  | Filler of Working Example 4 | Filler of Comparative Example 4 |
|---|---|---|
| Amount of 95% ee first component/day | 134 mg | 5.0 mg |
| Amount of 95% ee second component/day | 96 mg | 3.6 mg |

INDUSTRIAL APPLICABILITY

The present invention provides a process for preparing a filler suitable for separating a mixture of optical isomers, whereby a uniform and excellent filler for separating optical isomers which comprises a carrier and a large amount of an optically active polymer compound supported on the carrier. Thus a filler for separating optical isomers excellent in separation efficiency is also provided by the invention. Further, the present invention provides a method of using the filler, which is able to separate optical isomers. In particular, in accordance with the present invention can be efficiently produced the filler for separating optical isomers comprising a carrier and a large amount of a separator supported thereon, of which production was considered to be difficult conventionally.

We claim:

1. A process of producing a filler for separating optical isomers which comprises placing a carrier and a solution of an optically active polymer compound in a tank, and mixing the carrier and the solution with a double spindle vertical mixer to make the carrier support the optically active polymer compound.

2. The process as claimed in claim 1, wherein the double spindle vertical mixer has two stirring blades, each of which moves around in the tank while rotating.

3. The process as claimed in claim 1, wherein the moving direction and the rotating direction of each stirring blade are the same direction or opposite directions.

4. The process as claimed in claim 1, wherein each blade moves along the locus of a hypocycloid or a hypercycloid.

5. The process as claimed in claim 1, wherein each of the blades is a curved stirring stick or a curved stirring ring.

6. The process as claimed in claim 1, wherein the optically active polymer compound is a polysaccharide derivative.

7. The process as claimed in claim 6, wherein the polysaccharide derivative is at least one selected from the group consisting of a cellulose ester derivative, a cellulose carbamate derivative, an amylose ester derivative and an amylose carbamate derivative.

8. The process as claimed in claim 1, wherein the carrier is a porous inorganic carrier.

9. The process as claimed in claim 1, wherein the carrier has an average particle size of 1–300 $\mu$m, and an average pore size of 200–8,000 Å.

10. The process as claimed in any one of claim 1, wherein the carrier has an average particle size of 15–100 $\mu$m, and an average pore size of 200–4,000 Å.

11. The process as claimed in claim 1, wherein the carrier is silica gel.

* * * * *